United States Patent
Afshari

(10) Patent No.: US 12,362,899 B2
(45) Date of Patent: Jul. 15, 2025

(54) TIME SYNCHRONIZATION IN INDUSTRIAL SYSTEM

(71) Applicant: Schneider Electric Industries SAS, Rueil Malmaison (FR)

(72) Inventor: William Afshari, Saint-Paul de Vence (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 309 days.

(21) Appl. No.: 17/900,914

(22) Filed: Sep. 1, 2022

(65) Prior Publication Data

US 2023/0079341 A1   Mar. 16, 2023

(30) Foreign Application Priority Data

Sep. 10, 2021   (EP) .................................... 21306239

(51) Int. Cl.
*H04L 7/10* (2006.01)
*G06F 13/40* (2006.01)
(Continued)

(52) U.S. Cl.
CPC .......... *H04L 7/0008* (2013.01); *G06F 13/405* (2013.01); *H04J 3/0661* (2013.01); *H04J 3/0697* (2013.01)

(58) Field of Classification Search
USPC ........................................................ 370/503
See application file for complete search history.

(56) References Cited

U.S. PATENT DOCUMENTS 11,625,199 B2 *   4/2023   Kobayashi ............ G06F 3/0673
                                                          711/154
2014/0281037 A1 *   9/2014   Spada ................... H04J 3/0641
                                                          709/248

(Continued)

FOREIGN PATENT DOCUMENTS

EP             1717978 A1      11/2006

OTHER PUBLICATIONS

Leyrer, Thomas, et al., "Analysis and implementation of multi-protocol gigabit Ethernet switch for real-time control systems", 2021 IEEE International Conference on Communications Workshops, Jun. 14, 2021, 6 pages.

(Continued)

*Primary Examiner* — Gregory B Sefcheck
*Assistant Examiner* — Majid Esmaeilian
(74) *Attorney, Agent, or Firm* — Troutman Pepper Locke LLP

(57) ABSTRACT

An industrial system for controlling backplane communication, including:
- a cluster manager including a primary switch linked to a primary control module,
- at least one Input/Output, I/O, module including a secondary switch linked to a secondary control module,
- a unidirectional communication line linking the cluster manager to the at least one IO module through passive base plates,
- wherein the cluster manager includes a transmission port and a reception port on the unidirectional communication line and the at least one Input/Output module includes a reception port on the unidirectional communication line,
- wherein the primary control module is configured to generate a pulse via the transmission port on the unidirectional communication line, (Continued)

wherein, upon reception of the pulse, the primary control module is configured to create a primary timestamp from a primary clock of the primary switch and the secondary control module is configured to create a secondary timestamp from a secondary clock of the secondary switch, wherein the primary control module is configured to send a message via the transmission port on the unidirectional communication line to the secondary control module, the message including the primary timestamp, wherein, upon reception of the message, the secondary control module is configured to synchronize the secondary clock with the primary clock based on the received primary timestamp and secondary timestamp.

11 Claims, 2 Drawing Sheets

(51) Int. Cl.
*H04J 3/06* (2006.01)
*H04L 7/00* (2006.01)

(56) References Cited

U.S. PATENT DOCUMENTS

| | | | |
|---|---|---|---|
| 2019/0245890 A1* | 8/2019 | Zinner | H04L 63/20 |
| 2020/0259896 A1* | 8/2020 | Sachs | H04W 56/0065 |
| 2020/0310394 A1* | 10/2020 | Wouhaybi | H04L 67/1051 |
| 2021/0099341 A1* | 4/2021 | Moon | H04L 41/0806 |
| 2021/0400610 A1* | 12/2021 | Aijaz | H04L 7/0012 |
| 2022/0030662 A1* | 1/2022 | Mueck | H04W 76/50 |
| 2022/0070114 A1* | 3/2022 | Gogolev | H04L 45/70 |
| 2022/0094588 A1* | 3/2022 | Åkerberg | H04L 47/15 |
| 2022/0123849 A1* | 4/2022 | McCall | H04J 3/0658 |
| 2022/0166677 A1* | 5/2022 | Jabbar | H04L 47/28 |

OTHER PUBLICATIONS

Extended European Search Report dated Mar. 7, 2022 for corresponding European Patent Application No. EP21306239.1, 8 pages.

* cited by examiner

TIME SYNCHRONIZATION IN INDUSTRIAL SYSTEM

FIELD OF INVENTION

The present disclosure relates generally to industrial networks and, more particularly, to systems that support multiple industrial Ethernet protocols, fieldbus protocols, and industrial application processing, and provide high performance for backplane communication for programmable logic controller in industrial architecture.

BACKGROUND

Industrial automation/control systems are employed for controlling operation of a wide variety of systems, including processes, machines, etc., and are typically adaptable to different control applications through configuration and interconnection of multiple control system components or devices, such as control modules, Input/Output (I/O) modules, I/O devices, etc. Existing industrial control systems typically include a processor running or executing a control program to interact with an I/O system (e.g., typically one or more I/O modules or devices) to receive system information in the form of analog and/or digital inputs from field sensors and to provide outputs (analog and/or digital) to one or more actuators. Industrial control systems are increasingly being interconnected with management information and other systems in a manufacturing facility, and may be operatively connected to any number of communications networks to facilitate various business management functions such as inventory control, accounting, manufacturing control, etc., in addition to the process/machine control functionality.

A desire to integrate the business and control network structures to interconnect industrial control systems with general purpose systems, along with the evolution and development of fast Ethernet (e.g., in switch mode with full duplex capability), has allowed for Industrial Ethernet networks (e.g., such as Ethernet/IP networks that allow for direct connection of field devices to an Ethernet network) to be widely used in industrial applications. Indeed, industrial Ethernet is becoming the dominant (if not incumbent) technology in industrial automation.

In a slice I/O architecture, a standalone I/O island is connected to a control device like a programmable logic controller PLC with a fieldbus like Ethernet/IP and contains a head driving clusters of I/O modules respectively through cluster managers. A cluster is a set of I/O modules, up to 32 modules, physically linked together through a backplane and an I/O module is a usual automation module converting electrical signals to digital values. In a cluster, the cluster manager and different modules can communicate by means of their respective switches through a multipoint communication line.

For example, a port of a switch may be configured to send a specific frame at a schedule time window, especially if the switches share a same clock and are synchronized. The heads and the cluster managers can be synchronized using a Generalized Precision Time Protocol (gPTP) which employs layer 2 (Ethernet) messages to establish a hierarchy of clocks and synchronize time in a gPTP domain which the heads and the cluster managers belong to. For real-time communication with non-negotiable time boundaries for end-to-end transmission latencies, all switches should have a common time reference as their clocks are synchronizes among each other.

However with a multipoint communication line, the I/O modules cannot transmit before being synchronized and a standard stack in a switch of a I/O module needs to transmit before starting the synchronization algorithm.

There is therefore a need for enabling an efficient synchronization of a cluster manager and I/O modules, the respecting reliability and real time constraints, being resistant to measurement errors.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided an industrial system for controlling backplane communication, comprising:
- a cluster manager comprising primary switch linked to a primary control module, the primary switch being a Time Sensitive Network, TSN, switch implementing a primary clock,
- at least one Input/Output, I/O, module comprising a secondary switch linked to a secondary control module, the primary switch being a TSN switch implementing a secondary clock,
- a first unidirectional communication line and a second unidirectional communication line linking the cluster manager to the at least one IO module through passive base plates,
- wherein the cluster manager and said at least one I/O module are designed to communicate between them via a multipoint communication line, based on time-aware scheduler requiring time synchronization between the primary switch and the secondary switch,
- wherein the primary control module is configured to send a pulse on the first unidirectional communication line to the secondary control module and the primary control module,
- wherein, upon reception of the pulse, the primary control module is configured to create a primary timestamp from the primary clock of the primary switch and the secondary control module is configured to create a secondary timestamp from the secondary clock of the secondary switch,
- wherein the primary control module is configured to send a message on the second unidirectional communication line to the secondary control module, the message comprising the primary timestamp,
- wherein, upon reception of the message, the secondary control module is configured to synchronize the secondary clock with the primary clock based on the received primary timestamp and secondary timestamp.

Advantageously, the industrial system allows the I/O modules to be synchronized with the cluster manager without involving a switch nor a hub and enables the communication between I/O modules and the cluster manager while respecting real time constraint and low-cost products by the use of passive base plates and the first and second unidirectional communication lines. The use of the first and second unidirectional communication lines in passive base plates allows a high level of reliability with no active component in the backplane and minimized risk of failure and offers a low-cost solution a no external switch is needed.

Moreover, for the synchronization, typical path delay mechanisms are not required anymore since the path delay is eliminated by means of the pulse received at the same time by the cluster manager and the I/O modules via the first unidirectional communication line. The path delay is considered null or negligible so its calculation can be removed from a clock servo algorithm for synchronization.

Usually in Time Sensitive Network environment, the devices require to be synchronized to be allowed to communicate. However, to be synchronized they require to communicate in both ways. Over a full-duplex media, it is straight forward since the devices can communicate without being synchronized, there will not be collisions. However, in a half-duplex one, unsynchronized devices cannot send information without risking collisions, thus breaking the communication determinism. Therefore, the system allows a one-way synchronization solution that gets rid of this constraint, answers the issue of synchronizing over a half duplex media and removes the latency of standard synchronization principles.

In an embodiment, wherein the secondary control module is configured to calculate an offset between the primary timestamp and the secondary timestamp, and is configured to adapt the secondary clock based on the calculated offset to synchronize the secondary clock with the primary clock.

In an embodiment, the cluster manager comprises a transmission port and a reception port on the first unidirectional communication line and the at least one Input/Output module comprises a reception port on the first unidirectional communication line, and wherein the primary timestamp and the secondary timestamp are created simultaneously, the path delay between the reception port of the cluster manager and the reception port of the at least one Input/Output module being considered null or negligible.

In an embodiment, the multipoint communication line allows the cluster manager to transmit data in frames on the multipoint communication line at scheduled time windows to the at least one IO module when the primary clock and the secondary clock are synchronized.

In an embodiment, the primary switch and the secondary switch are implemented with the IEEE 802.1Qbv time-aware scheduler to schedule static time windows and dynamic time windows.

In an embodiment, the primary clock and the secondary clock are synchronized based on Precision Time Protocol.

In an embodiment, the primary clock is able to be synchronized in time based on a Generalized Precision Time Protocol in a time domain which other cluster managers belong to.

In an embodiment, the message further comprises an error-detecting code to determine if the message contains errors.

In an embodiment, the secondary control module determines a clock ratio based on a ratio between the time interval for two consecutive primary timestamps and the time interval for two consecutive secondary timestamps.

In another implementation, there is provided a method for controlling backplane communication of an industrial system that comprises:
  a cluster manager comprising a primary switch linked to a primary control module,
  at least one Input/Output, I/O, module comprising a secondary switch linked to a secondary control module,
  a first unidirectional communication line and a second unidirectional communication line linking the cluster manager to the at least one I/O module through passive base plates,
  wherein the cluster manager comprises a transmission port and a reception port on the unidirectional communication line and the at least one Input/Output module comprises a reception port on the unidirectional communication line, the method comprising:
  sending, by the primary control module a pulse on the first unidirectional communication line to the secondary control module and the primary control module,
  creating, by the primary control module, upon reception of the pulse, a primary timestamp from a primary clock of the primary switch and the secondary control module is configured to create a secondary timestamp from a secondary clock of the secondary switch,
  sending, by the primary control module, a message via the transmission port on the second unidirectional communication line to the secondary control module, the message comprising the primary timestamp,
  synchronizing, by the secondary control module, upon reception of the message, the secondary clock with the primary clock based on the received primary timestamp and secondary timestamp.

In another implementation there is provided a computer-readable medium having embodied thereon a computer program for executing a method for controlling backplane communication of an industrial system. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

In order to provide needed networking and communication support for Automated Control Systems, IEEE 802.1 time sensitive network (TSN) has emerged as a popular technology. TSN refers to the IEEE 802.1Q defined standard technology to provide deterministic messaging on standard Ethernet. TSN is a Layer 2 technology and is centrally managed and delivers guarantees of delivery and minimized jitter using time scheduling for those real-time applications that require determinism.

The IEEE 802.1Q standards work at OSI Layer 2. TSN is an Ethernet standard, rather than an Internet Protocol (IP) standard. The forwarding decisions made by the TSN bridges use the Ethernet header contents, not the IP address. The payloads of the Ethernet frames can be anything and are not limited to IP. This means that TSN can be used in any environment and can carry the payload of any industrial application.

Figure 1:
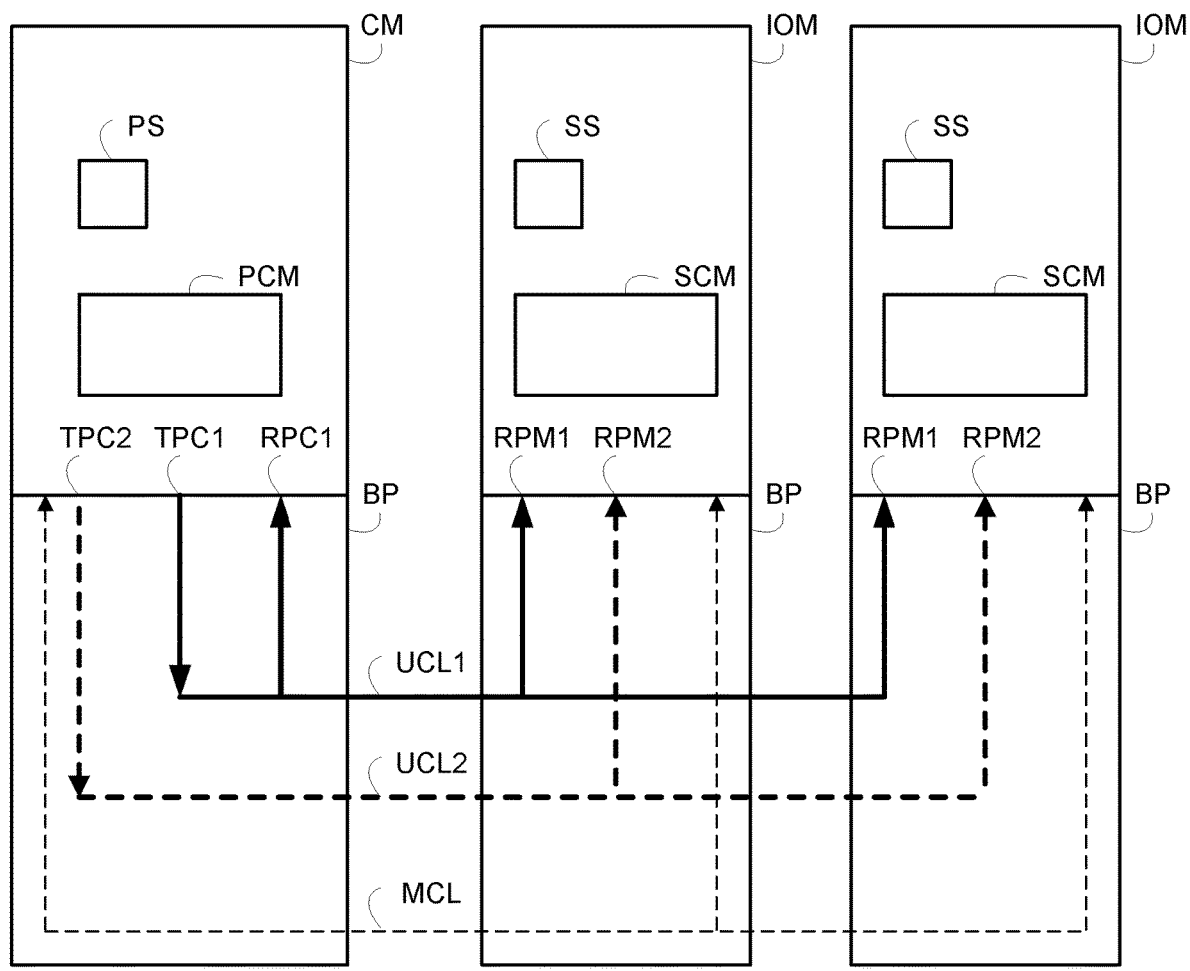
FIG. 1 shows a schematic block diagram of an industrial communication system using a first unidirectional communication line and a second unidirectional communication line between a cluster manager and I/O modules.

Referring to FIG. 1, an industrial communication system comprises a cluster manager CM, a set of I/O modules IOM, base plates BP, a first unidirectional communication line UCL1 and a second unidirectional communication line UCL2. Furthermore, the industrial communication system comprises a multipoint communication line MCL linking the cluster manager CM and the set of I/O modules IOM.

The cluster manager CM is able to manage communication with a set of I/O modules IOM, up to 32, via the multipoint communication line like a multipoint low voltage differential signaling (MLVDS) bus, and optionally with another cluster manager via Ethernet and CAN (Controller Area Network) bus. The cluster manager CM is driven by a head that can drive other cluster managers. In one embodiment, the cluster manager is included in the head connected via a fieldbus to a control device like a PLC. In one embodiment, the head is also included in the PLC.

An I/O module IOM can include Analog to Digital Converter (ADC) and Digital to Analog Converter (DAC) for connecting to sensors and the real world, communications modules, digital inputs and outputs, relays, and more. An I/O module communicates with the control manager CM through the communication bus with adapted packet formats.

The base plates BP are respectively associated with the I/O modules that are plugged into them. The base plates BP may be designed to form a backplane for the set of I/O modules, each combination of base plate and associated I/O module forming a slice of the backplane.

Each base plate is a passive base plate that offers no active bus driving circuitry, any desired arbitration logic being placed on the I/O module. A passive base plate is thus expected to not have a single point of failure (SPOF).

Each of the first unidirectional communication line UCL1 and the second unidirectional communication line UCL2 is a physical medium configured to be coupled to multiple I/O modules and the cluster manager and provides a multi-drop capability from the cluster manager. The cluster manager comprises a first transmission port TPC1 and a first reception port RPC1 on the first unidirectional communication line and each Input/Output module comprises a first reception port RPM1 on the first unidirectional communication line. The first unidirectional communication line is a signaling line allowing the cluster manager to send a synchronization signal like a pulse that is received simultaneously by the cluster manager itself and the I/O modules, assuming the propagation time in the first unidirectional communication line is negligible.

Similarly, the cluster manager comprises a second transmission port TPC2 on the second unidirectional communication line UCL2 and each Input/Output module comprises a second reception port RPM2 on the second unidirectional communication line. The second unidirectional communication line is a signaling line allowing the cluster manager to send data like a timestamp that are received simultaneously by the cluster manager itself and the I/O modules.

More precisely, the cluster manager CM comprises an interface on the second unidirectional communication line UCL2 like a universal asynchronous receiver-transmitter (UART) for asynchronous serial communication.

The cluster manager CM comprises a primary switch PS and a primary control module PCM. The primary control module PCM controls the first transmission port TPC1 and the first reception port RPC1 on the first unidirectional communication line UCL1, in order to transmit and receive data on this latter, like a pulse. The primary control module PCM further controls the second transmission port TPC2 on the second unidirectional communication line UCL2, in order to transmit data on this latter, like a timestamp.

An Input/Output module TOM comprises a secondary switch SS and a secondary control module SCM. The secondary control module SCM controls the first reception port on the first unidirectional communication line and the second reception port on the second unidirectional communication line, in order to receive data on these lines.

The primary switch PS and the secondary switch SS are defined as TSN switches which allow, if synchronized, a communication between the cluster manager and an I/O module without any collision in the data traffic. As mentioned before, TSN is a technology that is focused on time, and was developed to provide a way to make sure information can travel from point A to point B in a fixed and predictable amount of time. The primary switch PS and the secondary switch SS implement respectively a primary clock and a secondary clock.

The primary switch PS is a time-aware relay and implements for example the standard 802.1AS-Rev, and can be synchronized in time in a gPTP domain which heads and other cluster managers belong to.

The primary switch PS is able to run a gPTP stack in slave mode in the gPTP domain and is able to run a PTP stack, called sPTP, in master mode in a time domain, called sPTP domain, which the cluster manager and the I/O modules belong to. Thus a sPTP domain can be created for each cluster of I/O modules.

The primary switch PS is configured to use the first unidirectional communication line UCL1 to send a pulse that triggers a timestamp in any elements (I/O modules) of the backplane in order to synchronize the primary clock with the secondary clocks of the I/O modules. The second unidirectional communication line UCL2 is used to transport the time of the primary clock to all I/O modules.

To that end, the secondary switch SS is able to run a sPTP stack in slave mode in order to be synchronized with the primary switch PS running a sPTP stack in master mode that can be updated in the gPTP domain.

In this architecture, all the elements of a whole industrial system can be updated and synchronized in time: in the gPTP domain encompassing a northbound network and synchronizing all the cluster managers with heads, and in the sPTP domain encompassing a southbound network in each cluster of I/O modules and synchronizing all the I/O modules managers with their respective cluster manager.

More specifically, the primary control module PCM is able to generate a periodic pulse via the first transmission port on the first unidirectional communication line UCL1. The pulse is then received on the first reception port RPC1 of the cluster manager and the first reception port RPM1 of each I/O module.

Upon reception of the pulse, the primary control module PCM is able to create a primary timestamp from the primary clock of the primary switch and each secondary control module SCM is configured to create a secondary timestamp from the secondary clock of the corresponding secondary switch.

The primary control module PCM transmits a message via the second transmission port on the second unidirectional communication line UCL2, the message being received by all I/O modules linked to the second unidirectional communication line and comprising the primary timestamp. The message can further comprise an error-detecting code like a cyclic redundancy check (CRC) to determine if the message containing the primary timestamp contains errors or has been corrupted.

Upon reception of the message, each I/O module is able to synchronize the secondary clock with the primary clock based on the received primary timestamp and the previously created secondary timestamp.

More especially, the primary clock is associated with a primary counter and the secondary clock is associated with a secondary counter. The synchronization between the primary clock and the secondary clock is done by adapting the frequency of the secondary counter with the frequency of the primary counter.

As the primary timestamp was generated at the same time as the secondary timestamp, upon reception of the pulse, this mechanism allows the synchronization of the secondary clock with the primary clock and removes the delay from the line: delay measurement and compensation are not needed anymore in comparison with a classic PTP event message sequences that occur during synchronization.

Once the all the clocks are synchronized, in the sPTP domain and thus in the gPTP domain, all switches have a common time reference for real-time communication with non-negotiable time boundaries for end-to-end transmission latencies. The cluster manager CM is thus synchronized in time with the set of I/O modules and is able to communicate with the set of I/O modules via the multipoint communication line MCL.

By defining the primary switch PS as a gPTP slave, as time provider, the time synchronization of the upward network is propagated up to the secondary switches SS, as time subscribers. Doing so allows the time subscribers to get the upper network time reference and to introduce this backplane network into a wider but still synchronized network. Finally, since the synchronization is done on the Ethernet modules directly, they can all consume this tight synchronization to communicate efficiently.

The cluster manager CM further contains a packet processor that manages the data frames, like Ethernet frames, coming from the I/O modules through the primary switch PS via the multipoint communication line MCL. For example, the packet processor is able to extract the payload of each Ethernet frame, verify the signature of each payload, concatenate all payloads in one payload in only one concatenated Ethernet frame, calculate a new signature and send the concatenated Ethernet frame to a processing unit.

The primary switch and the secondary switch define which ports are configured to send or received data. For example, a port of the switch may be configured to send a specific frame at a schedule time window. Especially, a switch manages different traffic queues according to the concept of Time-Aware Shaping (TAS) introduced by IEEE 802.1Qbv standard. Time-Aware Shaping enables determinism by dividing traffic in different preconfigured time-slots configured in a Gate-Control-Lists (GCL). The time aware shaper consists different traffic queues. Each queue is associated with a gate and has a transmission selection algorithm which selects the next packet transmitted from the queue. The queue can be organized in first in first out (FIFO). The state of a gate can either be open or close, and only open gates can transmit packets. A time aware gate opens and closes according to its configured time. The schedule of the gate states is specified in the GCL. Each entry of the list consists of a set of gate states and their duration.

At each time cycle, the switch commands the opening of a gate for a scheduled time window for transmitting the data in the queue associated with said gate, the other gates remaining closed. At each time cycle, a switch may send data in a static time window, control data in another static time window, and potentially service data in a dynamic time window that is scheduled by the cluster manager.

Thanks to the synchronized clocks of the switches of the I/O modules, all the I/O modules can share the multipoint communication line MCL to transmit I/O data at respective scheduled static time windows with deterministic latency at each time cycle. Thanks to the IEEE 802.1Qbv time-aware scheduler, at least one I/O module can transmit service data on the communication bus at a scheduled dynamic time windows in a best effort way.

The primary control module PCM and the secondary control module are further configured to determine a clock ratio, as the primary clock and the secondary clock start drifting after synchronization because there was no clock ratio alignment. The clock drift may refer to several related phenomena where a clock (secondary clock) does not run at exactly the same rate as a reference clock (primary clock).

At each cycle "i", the primary control module PCM generates a pulse that triggers in the secondary control module SCM a generation of a secondary timestamp $st_i$ and the reception of a primary timestamp $pt_i$ from the primary control module.

A clock ratio $cr_i$ for cycle "i" can be defined as the ratio between the time interval for two consecutive primary timestamps and the time interval for two consecutive secondary timestamps:

$$cr_i = (pt_i - pt_{i-1}) / (st_i - st_{i-1})$$

Figure 2:
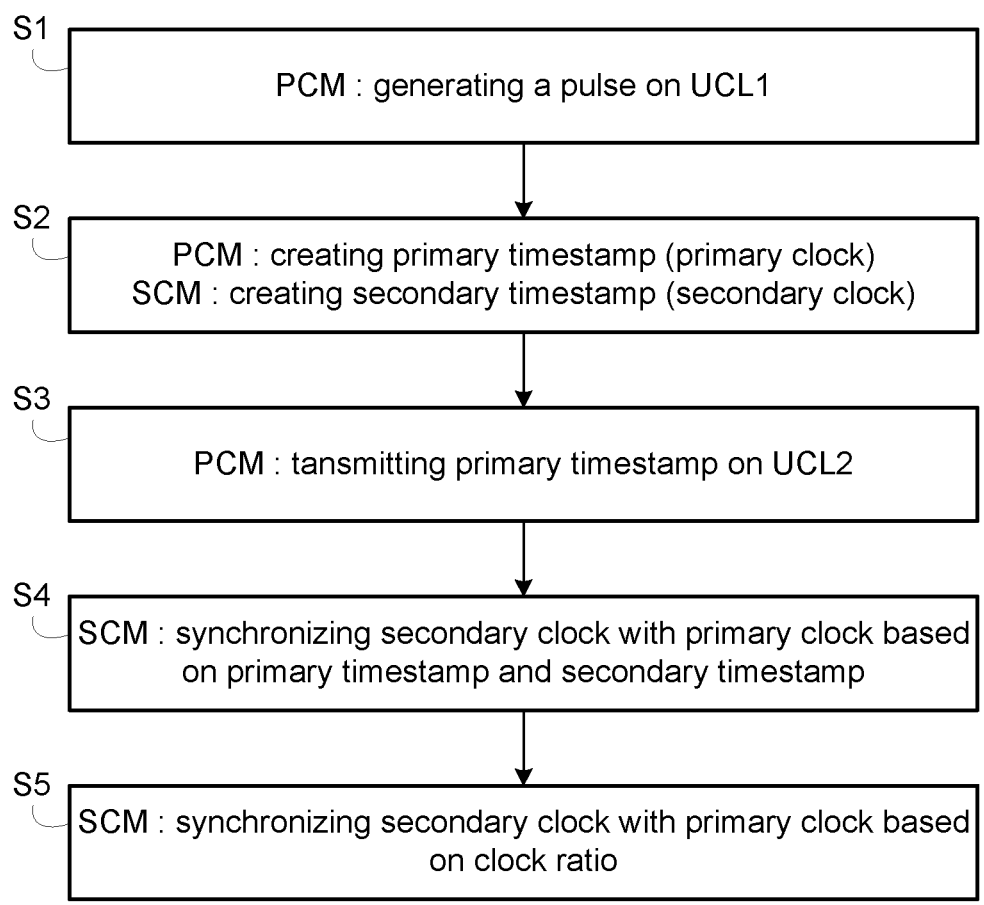
FIG. 2 is a flow diagram of a method for controlling backplane communication of an industrial system according to one embodiment.

With reference to FIG. 2, a method for controlling backplane communication according to one embodiment of the invention comprises steps S1 to S5.

In step S1, the primary control module PCM generates a pulse via the first transmission port TPC1 on the first unidirectional communication line UCL1. The pulse is received by each I/O module on its first reception port RPM1 and by the cluster manager itself on the first reception port RPC1.

In step S2, upon reception of the pulse, the primary control module PCM creates a primary timestamp from the primary clock of the primary switch PS. To that end, the primary control module PCM interrogates and captures the master PTP time base corresponding to the primary clock of the primary switch PS. The value of the master PTP time base captured by the primary control module PCM is sampled to create the primary timestamp.

At the same time upon reception of the pulse at each I/O module, because the path delay is considered null or negligible, the secondary control module SCM creates a secondary timestamp from the secondary clock of the corresponding secondary switch SS. Similarly, the secondary control module SCM interrogates and captures the master PTP time base corresponding to the secondary clock of the secondary switch SS.

In step S3, the primary control module PCM transmits a message via the second transmission port TPC2 on the second unidirectional communication line UCL2, the message comprising the primary timestamp and an error-detecting code. The message is received by each I/O module on its second reception port RPM2.

In step S4, after reception of the message, the secondary control module SCM of each I/O module is able to synchronize the secondary clock with the primary clock based on the received primary timestamp and the previously created secondary timestamp.

More especially, the secondary control module calculates the offset between the secondary timestamp and the primary timestamp and applies the calculated offset on the secondary clock, which makes the secondary clock at the same time as the primary clock.

In one embodiment, the cluster manager implements two components operating the primary switch PS. A first component operates as described before, with the gPTP stack in slave mode and the sPTP stack in master mode. A second component runs only a sPTP stack in slave mode in a similar way as a secondary switch of a I/O module.

Besides the I/O modules, after reception of the message, the cluster manager is able to synchronize an auxiliary clock with the primary clock based on the primary timestamp and a previously created secondary timestamp by the auxiliary clock in step S2 upon reception of the pulse.

In step S5, after a predefined time interval during which it is considered the primary clock and the secondary clock have drifted, the secondary control module determines a clock ratio based on a ratio between the time interval for two consecutive primary timestamps and the time interval for two consecutive secondary timestamps.

The secondary control module SCM of each I/O module is then able to synchronize the secondary clock with the primary clock based on calculated clock ratio.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. An industrial system for controlling backplane communication, comprising:
  a cluster manager comprising a primary switch linked to a primary control module, the primary switch implementing a primary clock,
  at least one Input/Output, I/O, module comprising a secondary switch linked to a secondary control module, the secondary switch implementing a secondary clock,
  a first unidirectional communication line and a second unidirectional communication line linking the cluster manager to the at least one I/O module through passive base plates,
  wherein the cluster manager comprises a first transmission port and a first reception port on the first unidirectional communication line and the at least one I/O module comprises a first reception port on the first unidirectional communication line, and wherein the cluster manager further comprises a second transmission port on the second unidirectional communication line and the at least one I/O module further comprises a second reception port on the second unidirectional communication line,
  wherein the primary control module is configured to send a pulse on the first unidirectional communication line to the secondary control module and the primary control module,
  wherein the pulse is received simultaneously by the cluster manager and the at least one I/O module, and upon reception of the pulse, the primary control module is configured to create a primary timestamp from the primary clock of the primary switch and the secondary control module is configured to create a secondary timestamp from the secondary clock of the secondary switch,
  wherein the primary control module is configured to send a message on the second unidirectional communication line to the secondary control module, the message comprising the primary timestamp,
  wherein, upon reception of the message, the secondary control module is configured to synchronize the secondary clock with the primary clock based on the received primary timestamp and secondary timestamp.

2. The industrial system according to claim 1, wherein the secondary control module is configured to calculate an offset between the primary timestamp and the secondary timestamp, and is configured to adapt the secondary clock based on the calculated offset to synchronize the secondary clock with the primary clock.

3. The industrial system according to claim 1, wherein the primary timestamp and the secondary timestamp are created simultaneously, the path delay between the reception port of the cluster manager and the reception port of the at least one I/O module being considered null or negligible.

4. The industrial system according to claim 1, wherein the cluster manager is further linked to the at least one I/O module via a multipoint communication line that allows the cluster manager to transmit data in frames on the multipoint communication line at scheduled time windows to the at least one I/O module when the primary clock and the secondary clock are synchronized.

5. The industrial system according to claim 1, wherein the primary switch and the secondary switch are implemented with the IEEE 802.1Qbv time-aware scheduler to schedule static time windows and dynamic time windows.

6. The industrial system according to claim 1, wherein the primary clock and the secondary clock are synchronized based on Precision Time Protocol.

7. The industrial system according to claim 1, wherein the primary clock is able to be synchronized in time based on a Generalized Precision Time Protocol in a time domain which other cluster managers belong to.

8. The industrial system according to claim 1, wherein the message further comprises an error-detecting code to determine if the message contains errors.

9. The industrial system according to claim 1, wherein the secondary control module determines a clock ratio based on a ratio between a time interval for two consecutive primary timestamps and a time interval for two consecutive secondary timestamps.

10. A method for controlling backplane communication of an industrial system that comprises:
- a cluster manager comprising a primary switch linked to a primary control module,
- at least one Input/Output, I/O, module comprising a secondary switch linked to a secondary control module,
- a first unidirectional communication line and a second unidirectional communication line linking the cluster manager to the at least one I/O module through passive base plates,
- wherein the cluster manager comprises a first transmission port and a first reception port on the first unidirectional communication line and the at least one I/O module comprises a first reception port on the first unidirectional communication line, and wherein the cluster manager further comprises a second transmission port on the second unidirectional communication line and the at least one I/O module further comprises a second reception port on the second unidirectional communication line the method comprising:
- sending, by the primary control module a pulse on the first unidirectional communication line to the secondary control module and the primary control module,
- receiving simultaneously, by the cluster manager and the at least one I/O module, the pulse,
- creating, by the primary control module, upon reception of the pulse, a primary timestamp from a primary clock of the primary switch and the secondary control module is configured to create a secondary timestamp from a secondary clock of the secondary switch,
- sending, by the primary control module, a message via the transmission port on the second unidirectional communication line to the secondary control module, the message comprising the primary timestamp,
- synchronizing, by the secondary control module, upon reception of the message, the secondary clock with the primary clock based on the received primary timestamp and secondary timestamp.

11. A non-transitory computer-readable medium having a computer program embodied thereon, the computer program comprising instructions which, when executed by a processor, cause the processor to perform the method for controlling backplane communication of an industrial system according to claim 10.

* * * * *